US008832599B2

(12) United States Patent
Deb

(10) Patent No.: US 8,832,599 B2
(45) Date of Patent: Sep. 9, 2014

(54) ASSISTED NAVIGATION IN VIRTUAL ENVIRONMENTS

(75) Inventor: Soumyajit Deb, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 1240 days.

(21) Appl. No.: 12/245,577

(22) Filed: Oct. 3, 2008

(65) Prior Publication Data

US 2010/0087257 A1  Apr. 8, 2010

(51) Int. Cl.
*G06F 3/048* (2013.01)
*A63F 9/24* (2006.01)
*G06N 3/00* (2006.01)
*G06F 3/0481* (2013.01)
*A63F 13/10* (2006.01)
*G06T 19/00* (2011.01)

(52) U.S. Cl.
CPC ............ *G06N 3/006* (2013.01); *G06F 3/04815* (2013.01); *G06T 19/00* (2013.01); *A63F 13/10* (2013.01)
USPC ........... 715/848; 715/849; 715/850; 715/851; 463/1

(58) Field of Classification Search
CPC ... G06F 8/34; G06F 3/04815; H04L 29/0809; A63F 13/10; G06T 19/00
USPC ................... 715/548–851; 463/43, 1
See application file for complete search history.

(56) References Cited

U.S. PATENT DOCUMENTS

| 5,948,040 | A | * | 9/1999 | DeLorme et al. ............. 701/201 |
| 6,034,692 | A |   | 3/2000 | Gallery et al. |
| 6,314,369 | B1 | * | 11/2001 | Ito et al. ........................ 701/209 |
| 6,405,129 | B1 | * | 6/2002 | Yokota ........................... 701/208 |
| 6,477,460 | B2 | * | 11/2002 | Kepler ........................... 701/209 |
| 6,961,055 | B2 |   | 11/2005 | Doak et al. |
| 7,027,049 | B2 |   | 4/2006 | Aliaga et al. |
| 7,058,896 | B2 |   | 6/2006 | Hughes |
| 7,148,892 | B2 |   | 12/2006 | Robertson et al. |
| 7,293,235 | B1 | * | 11/2007 | Powers et al. ................. 715/706 |
| 7,319,992 | B2 |   | 1/2008 | Gaos |
| 2001/0005809 | A1 | * | 6/2001 | Ito ................................. 701/210 |
| 2003/0132973 | A1 | * | 7/2003 | Hughes ........................ 345/850 |

(Continued)

OTHER PUBLICATIONS

Wernert et al.; "A Framework for Assisted Exploration with Collaboration"; Proceedings of the IEEE Conference on Visualization; 1999; pp. 241-248.

(Continued)

*Primary Examiner* — Tadeese Hailu
(74) *Attorney, Agent, or Firm* — Dan Choi; Judy Yee; Micky Minhas

(57) ABSTRACT

Navigational data may be collected from experienced users and paths may be extracted from the navigational data. One or more points of interest may be identified in the navigational data and the points of interests may be merged into an interest region. The navigational data may be reviewed for interest paths between the interest regions. The collection of possible interest paths may be reviewed interest paths in view of statistical procedures and criteria to determine if the interest path is a preferred interest path. If the preferred interest path does not satisfy the predefined constraints, additional interest paths may be reviewed by substituting an additional interest path for the interest path and repeating the review the interest path analysis. If the preferred interest path satisfies predefined criteria, a walkthrough of the virtual world may be generated based on the preferred interest path.

21 Claims, 3 Drawing Sheets

(56) References Cited

U.S. PATENT DOCUMENTS

| | | | |
|---|---|---|---|
| 2004/0107220 A1* | 6/2004 | Natesan et al. | 707/104.1 |
| 2005/0203698 A1* | 9/2005 | Lee | 701/200 |
| 2006/0080029 A1* | 4/2006 | Kodani et al. | 701/208 |
| 2006/0167621 A1* | 7/2006 | Dale | 701/202 |
| 2006/0200304 A1* | 9/2006 | Oh | 701/200 |
| 2007/0291034 A1 | 12/2007 | Dones | |
| 2008/0086696 A1 | 4/2008 | Sri Prakash et al. | |
| 2009/0005973 A1* | 1/2009 | Salo et al. | 701/209 |
| 2009/0005987 A1* | 1/2009 | Vengroff et al. | 701/300 |
| 2009/0018766 A1* | 1/2009 | Chen et al. | 701/202 |
| 2009/0077100 A1* | 3/2009 | Hancock et al. | 707/10 |

OTHER PUBLICATIONS

Mueller-Tomfelde et al.; "Interactive Landmarks: Linking Virtual Environments with Knowledge-Based Systems"; Proceedings of the OZ-CHI; Wollongong, Australia; Nov. 2004.

Adobbati et al.; "Gamebots: A 3D Virtual World Test-Bed for Multi-Agent Research"; Proceedings of the Second International Workshop on Infrastructure for Agents, MAS, and Scalable MAS; 2001; vol. 45; pp. 47-52.

Hanson et al.; "Constrained 3D Navigation with 2D Controllers"; Proceedings of Visualization '97; 1997.

Calomeni et al.; "Assisted and Automatic Navigation in Black Oil Reservoir Models based on Probabilistic Roadmaps"; Proceedings of the 2006 Symposium on Interactive 3D graphics and games; 2006, ACM Press; pp. 175-182.

Canny, J.F.; "The complexity of robot motion planning"; MIT Press; Jun. 1988.

Drucker, et al.; "Intelligent camera control in a virtual environment"; Proceedings of Graphics Interface '94,1994; pp. 190-199.

Gottschalk, et al.; OBBTree: A Hierarchical Structure for Rapid Interference Detection; SIGGRAPH '96: Proceedings of the 23rd Annual Conference on Computer Graphics and Interactive Techniques; ACM Press, 1996; pp. 171-180.

Hong, et al.; "Virtual Voyage: Interactive Navigation in the Human Colon"; SIGGRAPH '97: Proceedings of the 24th Annual Conference on Computer Graphics and Interactive Techniques, ACM Press/ Addison-Wesley Publishing Co., 1997; pp. 27-34.

Igarashi, et al.; "Path Drawing for 3d Walkthrough"; UIST '98: Proceedings of the 11th Annual ACM Symposium on User Interface Software and Technology; ACM Press; 1998; pp. 173-174.

LaViola et al.;"Hands-Free Multi-Scale Navigation in Virtual Environments"; I3D '01: Proceedings of the 2001 Symposium on Interactive 3D Graphics; ACM Press; New York, NY; 2001; pp. 9-15.

Kavraki et al.; "Randomized Preprocessing of Configuration Space for Fast Path Planning"; Proceedings of the IEEE International Conference on Robotics and Automation; San Diego, California; 1994; pp. 2138-2139.

Khan et al.; "HoverCam: Interactive 3D Navigation for Proximal Object Inspection"; SI3D '05: Proceedings of the 2005 Symposium on Interactive 3D Graphics and Games; ACM Press; New York, NY; 2005; pp. 73-80.

Barraquand, J. et al.; "Robot Motion Planning: A Distributed Representation Approach"; Stanford University; Stanford, California; May 1989; pp. 1-57.

MacKinlay et al.; "Rapid Controlled Movement Through a Virtual 3D Workspace"; Computer Graphics; vol. 24, No. 4; Aug. 1990; pp. 171-176.

Nieuwenhuisen et al.; "Motion Planning for Camera Movements in Virtual Environments"; Tech. Rep., Utrecht University; Jan. 30, 2003; pp. 1-19.

Overmars et al.; "A Probabilistic Learning Approach to Motion Planning"; WAFR: Proceedings of the workshop on Algorithmic foundations of robotics; A. K. Peters, Ltd.; Natick, MA, USA; Jan. 1994; pp. 19-37.

Salomon et al.; "Interactive Navigation in Complex Environments Using Path Planning"; SI3D '03: Proceedings of the 2003 symposium on Interactive 3D graphics; ACM Press; 2003; pp. 41-50.

Slater et al.; "Steps and Ladders in Virtual Reality"; ACM Proceedings of VRST '94—Virtual Reality Software and Technology, World Scientific Publishing Company; 1994; pp. 45-54.

Slater et al.; "Taking Steps: The Influence of a Walking Technique on Presence in Virtual Reality"; ACM Transactions on Computer-Human Interaction; vol. 2, No. 3; 1995; pp. 201-219.

Usoh et al.; "Walking>Walking-in-Place>Flying, In Virtual Environments"; SIGGRAPH '99: Proceedings of the 26th annual conference on Computer graphics and interactive techniques; ACM Press/Addison-Wesley Publishing Co.; 1999; pp. 359-364.

* cited by examiner

ASSISTED NAVIGATION IN VIRTUAL ENVIRONMENTS

BACKGROUND

This Background is intended to provide the basic context of this patent application and it is not intended to describe a specific problem to be solved.

As maps become more and more detailed and sophisticated, traversing the maps has become difficult, even to experienced users. The size and complexity of virtual spaces, especially 3-D spaces, is so difficult, users often become frustrated.

Attempts have been made to assist users traverse through 3-d spaces. These solutions are often linear and do not take into account that other objects that might not be included on the linear path may be worth viewing. Further, these solutions ignore that other people may have found a useful path between two points.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system of assisting navigation through a three dimensional virtual space is disclosed. Navigational data may be collected from experienced users and paths may be extracted from the navigational data. One or more points of interest may be identified in the navigational data and the points of interests may be merged into an interest region. The navigational data may be reviewed for interest paths between the interest regions. The collection of possible interest paths may be reviewed interest paths in view of statistical procedures to determine if the interest path is a preferred interest path according to a statistical measure. The interest path then may be reviewed in view of constraints. If the preferred interest path does not satisfy the predefined constraints, additional interest paths may be reviewed by substituting an additional interest path for the interest path and repeating the review the interest path analysis. If the preferred interest path satisfies predefined criteria, a walkthrough of the virtual world may be generated based on the preferred interest path.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
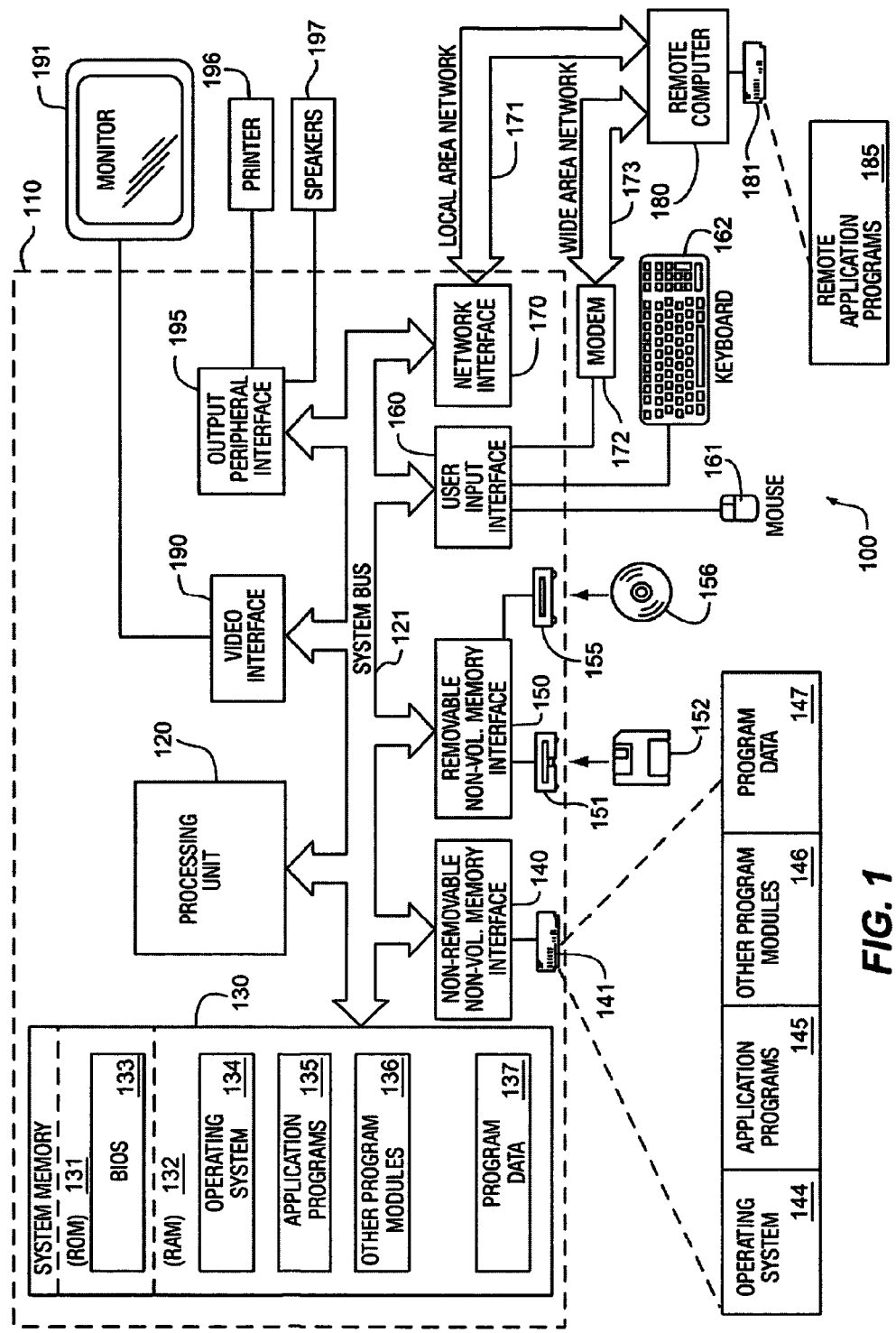
FIG. 1 is an illustration of a portable computing device.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170. Remote computer 180 may contain hard disk drive 181 storing remote application programs 185.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141, a magnetic disk drive 151 that reads from or writes to a magnetic disk 152, and an optical disk drive 155 that reads from or writes to a optical disk 156. The hard disk drive 141, 151, and 155 may interface with system bus 121 via interfaces 140, 150. The hard disk drive 141 may include operating system 144, application programs 145, other program modules 146, and program data 147.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

Figure 2:
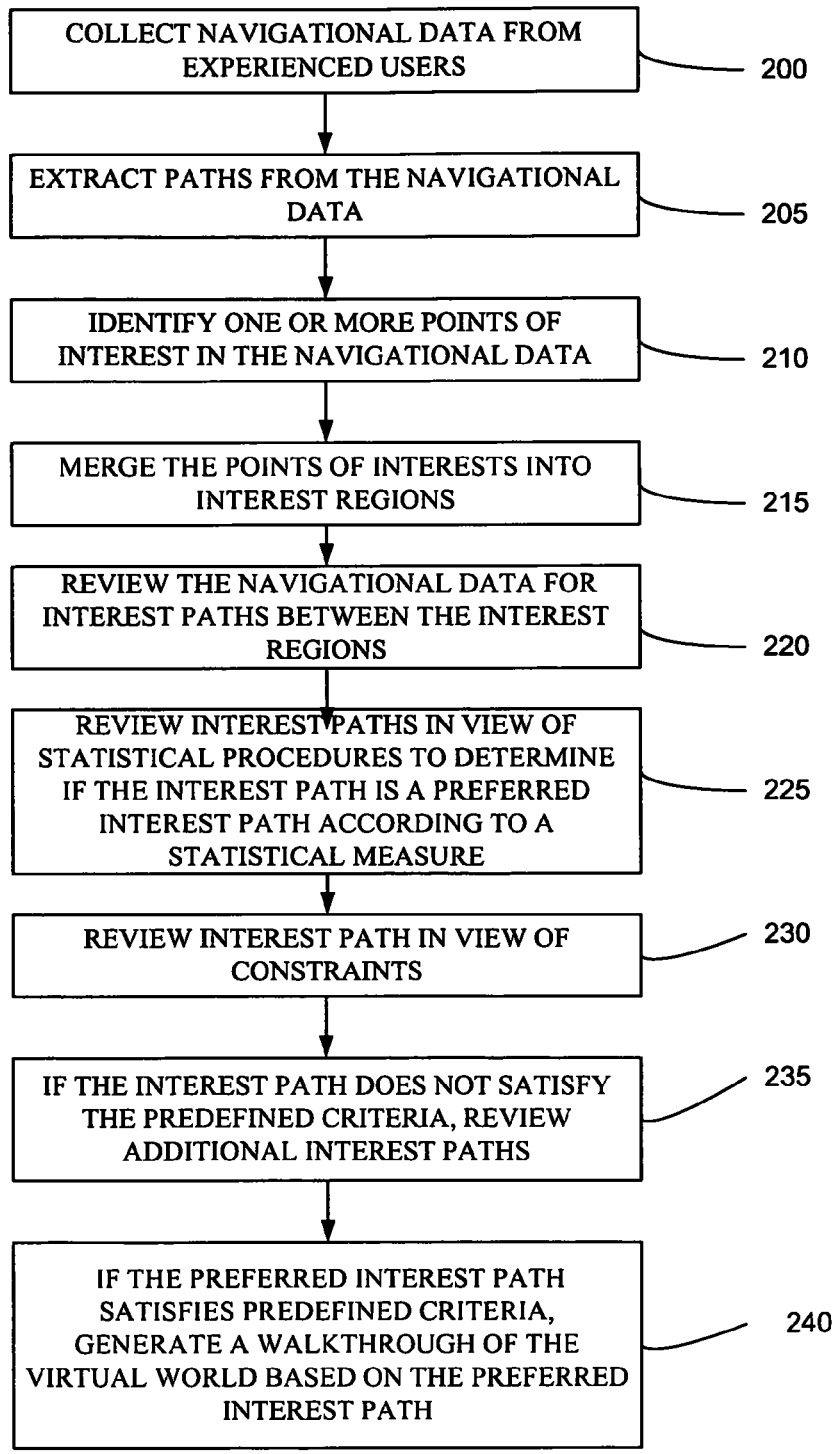
FIG. 2 is an illustration of a method of assisting navigation through a three dimensional virtual space.

FIG. 2 may illustrate a method of method of assisting navigation through a three dimensional virtual space. The various embodiments of the method may attempt to use the idea of automatic navigation in 2D/3D virtual environments using a-priori knowledge gathered by analyzing track logs of expert users. This basic idea is to use the navigation logs of existing expert users of a 3D navigation system and then use this data to create walkthrough paths in the environment which can assist the navigation experience of new users or augment existing navigation schemes using bots. The method may automatically learn and improve navigation strategies whenever additional data is available.

The algorithm may be suitably combined with multiple other path finding systems, augmenting their strengths. As the approach is data driven, it may work well in complex environments. The method may be extremely efficient in cases where standard well known path finding algorithms which are based upon search of spatial data structures have trouble navigating. The accuracy of the system may improve with additional data added to it.

Unlike greedy or dynamic programming techniques which can sometimes fail or get into a loop to find a path, the described method may always find a path between two points if it has been traveled on by a user in previous navigation sessions. In a completely automated walkthrough, the system may mimic real human navigation. This data driven approach is useful in cases when a number of casual/non expert users use the system. A result of the method is that it can assist novice and experienced users navigate through complex virtual environments based upon the existing knowledge base without requiring any user input.

The method may depend upon available data and the accuracy and efficacy of the method may be dependent on the quality of data available to the system. The tracks used for training the system must be of good quality or else the path finding may be poor. A corollary of this is in case of building artificial intelligence (AI) bots—bots may be built of different AI levels by basing their path finding techniques on users with varied skills. The basic requirements for a path finding system are: 1) Knowledge of the environment geometry or structure; 2) The ability to decompose the complete environment into smaller basic blocks and knowledge of paths for traversal from one block to another; and 3) A quick way of identification of the blocks closest from source and destination.

The described method may accept any given world geometry. It may be assumed that the world geometry has some kind of partitioning information to quickly access any block in the world. Specifically, the data must be in some spatially partitioned representation such as an oct tree or quad tree or binary space partition (bsp) tree or similar which may allow the method to quickly visit any specific node of the tree and also find its location with respect to other nodes.

At block 200, navigational data may be collected from experienced users. In one embodiment, time stamped tracklog may be collected from a user. For example, in Microsoft Virtual Earth, the tracklog consists of tile server (IIS) log which is simply a Web server log consisting of an IP address and requested tiles for a particular user location. In the case of a computer game, the log consists of player recorded games that stores every action by a player (including locations visited), in the course of a 15 minute game. The sampling rate of this demo may be altered when recording the demo allowing for a finer level of granularity based upon the complexity of the particular environment.

At block 205, paths may be extracted from the navigational data. Once path 300 information is available, routes must be scanned for routes connecting various nodes. Visibility information of a node to any other node may be extracted using the tree representation. It may be easy to find the path 300 between two nodes that are visible from each other as one may follow direct line of sight. Such line of sight methods are commonly used in many applications that require automatic navigation. However, the problem arises with nodes that do not have line of sight information and navigation information of such nodes must be extracted from user tracklogs.

One aim of the system may be to learn navigation through the virtual environment using multiple track logs of existing users. These track logs are collected whenever any expert user uses the system for navigation. A track log in a 3D environment typically consists multiple of samples of the user motion. Each sample may consist of the following information:

1) Timestamp of access;
2) User information;
3) Location of the user in the environment;
4) The vector describing the direction of motion;
5) The orientation of the axes of reference; and
6) Additional motion information.

Sometimes the available data might be incomplete. The data may only contain the location of the user in the virtual environment and the rest can be inferred indirectly. It might also be possible to reconstruct an approximate path based upon partial information. The accuracy of the system may depend on available information.

Individual navigational paths for each user may then be created. For example, the virtual earth extracted data was converted into XML for easy storage and looks something like the following:

```
<IP Name ="24.4.132.82" >
    <Time Name ="23:59:59" >
        <Tiles>a02132011111313003.jpeg</Tiles>
        <Tiles>a021320230133102101.jpeg</Tiles>
        <Tiles>a021320230133102103.jpeg</Tiles>
    </Time>
    <Time Name ="00:00:01" >
        <Tiles>a021320230120211120.jpeg</Tiles>
        <Tiles>a021320230120211121.jpeg</Tiles>
        <Tiles>a021320313030211020.jpeg</Tiles>
        <Tiles>a021320313030211021.jpeg</Tiles>
        <Tiles>a021320313030211022.jpeg</Tiles>
        <Tiles>a021320313030211023.jpeg</Tiles>
        <Tiles>a021320211113112030.jpeg</Tiles>
        <Tiles>a021320120100223200.jpeg</Tiles>
        <Tiles>a021320120100223201.jpeg</Tiles>
    </Time>
</IP>
```

In case of the computer game, the path information may simply be a list of points 310 visited by the player.

At block 210, one or more points of interest 310 in the navigational data may be identified. The start and end point of each track log may be extracted and the corresponding nodes in the space partitioned tree may be found. Interest points 310 may be identified as points where users stop, pause or gather additional goods or information. Such data may be stored very efficiently in a hash table for quick access during pre-processing. Once a large number of track logs have been analyzed, most common start points and end points for these track logs may be identified and then the most common start and end points may identified. In addition, the track log may identify points of interest 310 along with the time spent at the points of interest 310 and the points of interest 310 may be stored. If the purpose of the point of interest 310 is known (for example, an ammunition supply station), this data may also be stored.

At block 215, the points of interest 310 may be merged into interest regions 320. Once the interest points 310 are identify, a region growing algorithm may be used to find suitable clusters of interest points 310 that may be marked as a group or region 320. The interest regions 320 may be a collection of points of interest 310 that are close to each other in the virtual space and are often visited together. The interest regions 320 may then be used as a basis for further searches into the virtual environment. For example, in Virtual Earth, the points may be a set of most frequently accessed tiles. In case of a computer game, it may be the set of most frequently accessed interest regions of a Space Partitioning Tree. In a computer game, this would probably be a set of nodes of a BSP tree that are spatially coherent. The sites may be dense and may span the entire environment.

The growing algorithm may expand the analysis and determine whether additional points of interests 310 are captured. If the interest region 320 expands and no additional points of interest 310 appear, then the algorithm may expand further or stop and determine if the interest regions 320 is acceptable. If the region expands and additional points of interest 310 appear, the interest region 320 may grow and the algorithm may grow again. Growing algorithms are known and any appropriate algorithm may be used.

At block 220, the navigational data for interest paths 300 between the interest regions 320 may be reviewed. Again, the navigation data from experienced users may be reviewed to see if previous users have traveled from one interest region 320 to another. The interest paths 300 may be collect and may be further analyzed at block 225. If the start or end point is near an interest region 320, the method may look at paths between the interest regions 320.

At block 225, interest paths 300 may be reviewed in view of statistical procedures to determine if the interest path 300 is a preferred interest path 300 according to a statistical measure. A sample statistical metric may be the most commonly traveled path 300. In another embodiment, the path 300 may be the path 300 that is the quickest to traverse. Of course, other statistical measures are possible and are contemplated.

At block 230, the interest path 300 may be reviewed. In one embodiment, if may be determined whether the preferred interest path 300 satisfied predefined constraints. More specifically, the path 300 must be compatible with any applicable constraints in the game or in the map such as a path 300 cannot pass through an immovable object, etc. For cases with constraints, the most suitable path 300 may be found after application of the constraint. The suitability of a particular metric is dependent on the type of navigation and complexity of the environment and may vary depending upon that. For each segment of the path 320, a combination of global and local knowledge about the configuration of the environment may be chosen. For example, in mapping system, a constraint may be applied on the path 300 so that the navigation system must utilize only roads. In such a case, a routing algorithm based upon shortest path 300 may be used.

In computer games, there may be constraints on navigation placed by the environment itself such as multiple floors in a virtual environment which can only be climbed by using a staircase etc. Such constraints need to be followed and such following may be automatic as the existing paths 300 incorporate these constraints. In another embodiment, the constraints may be based on the needs of the player in a game application. For example, in a game, if a player needs food and does not need ammunition, these criteria may be factored into selecting a path 300 in the game. Similarly, if a user likes trains but does like to fly, these criteria may be factored into selecting a path 300 in a map.

At block 235, if the interest path 300 does not satisfy the predefined criteria, additional interest paths 300 may be reviewed. For example, if an interest path 300 on a map does not use roads, another interest path 300 may be used. In another example, a user may wish to traverse by train so only train based interest paths 300 may be appropriate. The number and variety of constraints is only limited by the imagination.

At block 240, if the preferred interest path 300 satisfies predefined criteria, a walkthrough of the virtual world may be generated based on the preferred interest path. The path 300 may lead the user through the 3-d environment. The path 300 may be a 3-d map, an overhead view, an oblique view or a combination of views. The view may be any view appropriate to the application. For example, in a game like Quake, the path 300 may fit into the type of views available on Quake and in a map like Virtual Earth, the path 300 may be a path 300 of the type normally displayed in Virtual Earth.

In some embodiments, the path 300 may be selected by the user from a plurality of 300. The paths 300 may indicate features available on the path 300 such as food, water, gas, visitor centers, etc. The paths 300 also may indicate the constraints satisfied by the path 300 such as shortest distance, most food available, etc. In some embodiments, the path 300 may automatically force a user to stop near points of interest 310 that a player might miss. For example, if a user seeks a path 300 through Chicago, the path 300 may pan the view of the user away from Lake Michigan (which may be one point of interest 310) and toward the skyline of Chicago (another point of interest 320).

Figure 3:
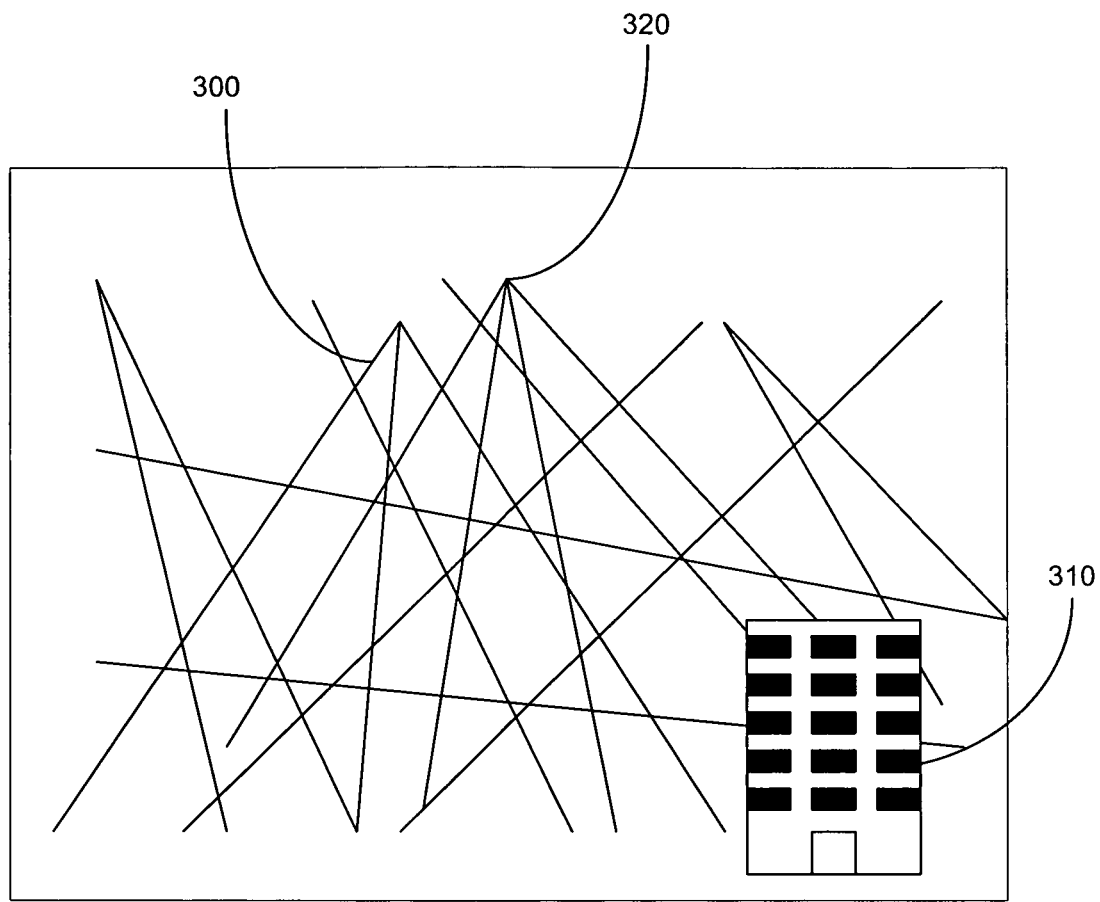
FIG. 3 is an illustration of a display of sample virtual paths.

FIG. 3 illustrates an embodiment where the paths are presented to the user and the user may select the path 300 desired. Additional data may also be displayed near the various paths such that a user can select the path 300 that sounds the most appropriate. For example, one path 300 may be more scenic and another path 300 may be more direct and user may select the desired path 300 based on the displayed data. The paths 300 may be color coded to indicate the attributes of the path 300, such as a path 300 being a shortest distance, blue being paths 300 that include water, green paths 300 being the most scenic, etc.

The following are some examples of the method as applied to various applications. In Microsoft Virtual Earth, the basic structure may be Quad Trees. There may be nineteen different levels of information and the leaf nodes of the tree may contain the actual tiles. The basic objective of a walkthrough application in Virtual Earth may be to help a user find his way in a very large sea of information. The relevant chunks of information may need to be identified and be used to push the user towards what is perceived by the system to be "interesting" based upon other user track logs.

In this case where regions of interest 320 are identified, it is may be easy to navigate between them based upon popularity.

The most popular regions 320 may be identified and tagged. An automatic walkthrough may be created based upon the popularity of the region 320. The sequence of regions 320 may be from regions 320 of high popularity to regions 320 of lower popularity. Alternatively, a walkthrough application may create a set of clickable waypoints for the user that may be used to string together a customized walkthrough application.

In the game Quake 3 or any other first person shooter game, the idea may be to navigate an environment as quickly as possible while consuming as much of resources available in the environment and "fragging" or killing the opponent as many times as possible. The basic question may be the speed of navigation. The problem is inherently the same as the above with the constraint of real-time performance. Quake 3 may use an inbuilt finite automaton to decide the state of the bot and acts accordingly and by following the method, the bot may be improved by improving the navigation capabilities of the bot while leaving the core decision making to the game engine. In this case, once the source and destination is identified, the basic question in this case may be to navigate from the source to the destination quickly while achieving maximum benefit. The measure of benefit (food, ammunition, time) may be decided by the game engine. With the source and destination known, the regions closest to the source and the destination may be identified based upon line of sight. Paths 320 may be found between these regions using the available tracklogs for the pair and select the path 300 that maximizes the game engine decided benefit.

In conclusion, the method may be used to assist users navigate through three dimensional spaces. This basic idea is to use the navigation logs of existing expert users of a 3D navigation system and then use this data to create walkthrough paths 300 in the environment which can assist the navigation experience of new users or augment existing navigation schemes using bots. The method may automatically learn and improve navigation strategies whenever additional data is available. Previous paths 300 used by experienced users may be stored and studied to find a path 300 that meets a particular user's needs. The needs may be viewed as constraints and the various pre-existing paths 300 may be used to satisfy the constraints.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method performed by at least one computing device, the method comprising:
   collecting, in a gaming environment, a log of locations previously visited by users;
   extracting paths from the log of locations;
   identifying a plurality of points of interest along the extracted paths;
   merging the plurality of points of interests into interest regions, wherein each interest region includes a collection of points of interest located within a defined distance of each other;
   identifying interest paths between the interest regions;
   reviewing the interest paths in view of a statistical procedure to determine a preferred interest path according to a statistical measure;
   determining whether the preferred interest path satisfies a predefined constraint;
   in a first instance where the preferred interest path does not satisfy the predefined constraint, substituting an additional interest path for the preferred interest path and repeating the determining; and
   in a second instance where the preferred interest path satisfies the predefined constraint, generating a walkthrough path of the gaming environment based on the preferred interest path.

2. The method of claim 1, wherein an individual point of interest is derived from time-marks that indicate the users lingering or obtaining additional assistance.

3. The method of claim 1, wherein the predefined constraint comprises limitations based on a geographic structure.

4. The method of claim 1, wherein the predefined constraint comprises limitations based on user travel preferences.

5. The method of claim 1, wherein the predefined constraint comprises limitations based on a need of an individual user in an application.

6. The method of claim 1, wherein the statistical procedure further comprises determining the preferred interest path based on a minimum time.

7. The method of claim 1, wherein the statistical procedure further comprises determining the preferred interest path based on a minimum distance.

8. The method of claim 1, wherein the statistical procedure further comprises determining the preferred interest path based on a minimum time and a maximum number of points of interest.

9. The method of claim 1, further comprising displaying a subset of the interest paths to an individual user and permitting the user to select the preferred interest path.

10. The method of claim 9, further comprising displaying relevant data about the subset of the interest paths.

11. The method of claim 1, wherein an individual point of interest includes an individual location about which one of the users gathered additional information.

12. A computer storage volatile or nonvolatile memory comprising computer executable code that, when executed by a computer processing unit, causes the computer processing unit to perform acts comprising:
   extracting virtual paths from virtual navigational data associated with a virtual environment, wherein the virtual navigational data identifies various virtual locations in the virtual environment that were visited by previous users of the virtual environment that traveled along the virtual paths within the virtual environment;
   identifying virtual points of interest along the virtual paths by determining, based on the virtual locations in the virtual navigational data, that the previous users stopped or paused at the virtual points of interest when travelling along the virtual paths;
   merging the virtual points of interest into a plurality of virtual interest regions using a region growing algorithm;
   deriving a plurality of virtual interest paths between the plurality of virtual interest regions; and creating a virtual walkthrough path by selecting one of the plurality of virtual interest paths based on a predefined constraint.

13. The computer storage volatile or nonvolatile memory of claim 12, wherein the predefined constraint comprises limitations based on at least one of:
a geographic structure;
a set of user travel preferences; and
a user need in an application.

14. The computer storage volatile or nonvolatile memory of claim 12, the acts further comprising:
determining that individual previous users gathered additional goods or information at corresponding individual virtual locations identified in the virtual navigation data; and
designating the individual virtual locations where the individual previous users gathered the additional goods or information as individual virtual points of interest.

15. The computer storage volatile or nonvolatile memory of claim 12, wherein the virtual locations are represented in the virtual navigation data as corresponding map tiles.

16. The computer storage volatile or nonvolatile memory of claim 12, the acts further comprising:
deriving an individual virtual interest path that ends in an individual virtual interest region.

17. A computer system comprising:
a processing unit; and
a memory in communication with the processing unit and storing computer executable instructions,
wherein the computer executable instructions cause the processing unit to:
extract a plurality of virtual paths from virtual navigational data, wherein the virtual navigational data identifies various virtual locations in a virtual environment that were visited by previous users of the virtual environment;
identify virtual points of interest along the virtual paths by determining, based on the virtual locations in the navigational data, that the previous users of the virtual environment stopped or paused their movement at the virtual points of interest when travelling along the virtual paths;
merge the virtual points of interest into a plurality of virtual interest regions;
derive a plurality of virtual interest paths between the plurality of virtual interest regions; and
select an individual virtual interest path to guide a new user of the virtual environment.

18. The computer system of claim 17, wherein the computer executable instructions cause the processing unit to:
derive the selected individual virtual interest path by identifying a most commonly traveled path used by the previous users of the virtual environment to travel between two virtual interest regions.

19. The computer system of claim 17, wherein the computer executable instructions cause the processing unit to:
use the selected individual virtual interest path for a walkthrough of the new user through the virtual environment.

20. The computer system of claim 17, wherein the computer executable instructions cause the processing unit to:
determine that individual previous users of the virtual environment gathered additional virtual goods at corresponding individual virtual locations identified in the virtual navigation data; and
designate the individual virtual locations where the individual previous users gathered the additional goods as individual virtual points of interest.

21. The computer system of claim 17, wherein the computer executable instructions cause the processing unit to:
designate at least some of the previous users as expert users of the virtual environment and use corresponding virtual navigational data for the expert users to identify the virtual points of interest.

* * * * *